Aug. 11, 1931.  H. H. GLASIER  1,818,551
OSCILLATING SPADER
Filed Aug. 23, 1929  2 Sheets-Sheet 1
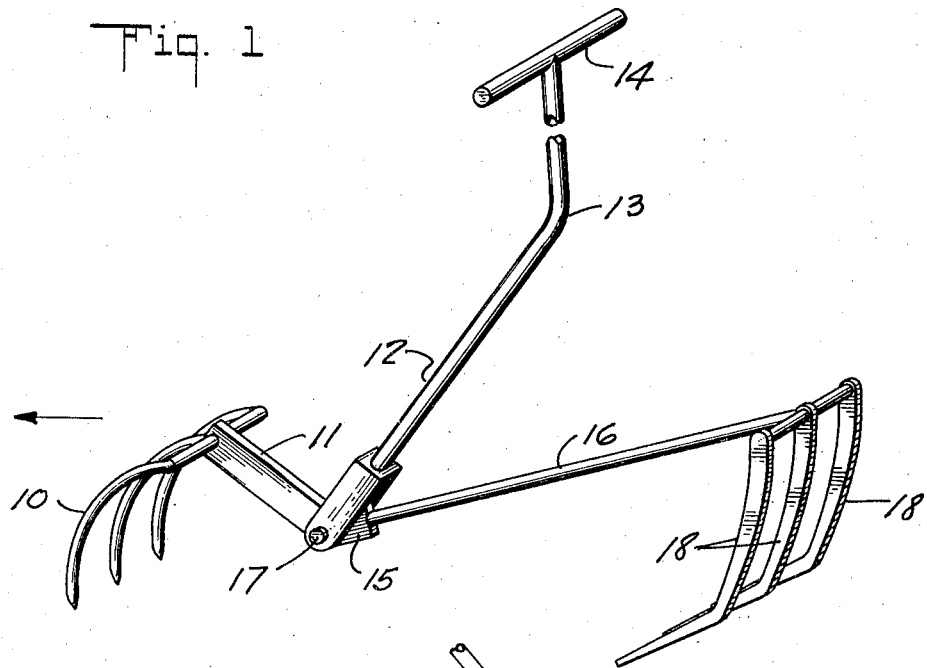
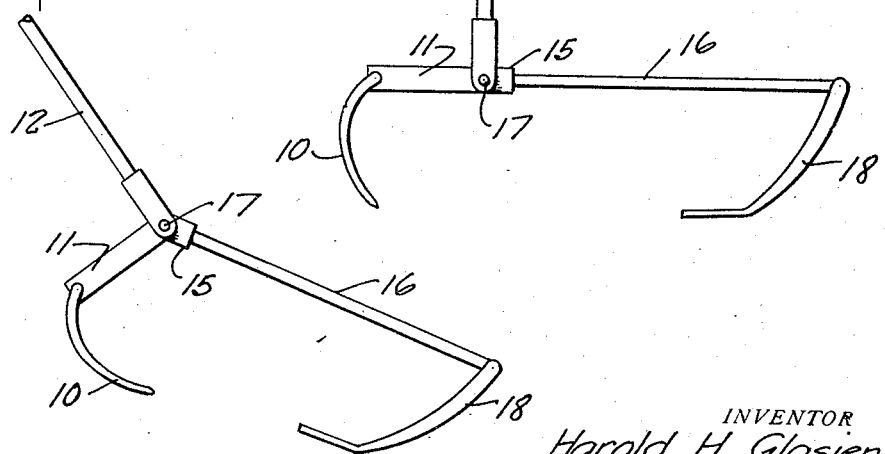
INVENTOR
Harold H. Glasier
BY Westall and Wallace
ATTORNEYS

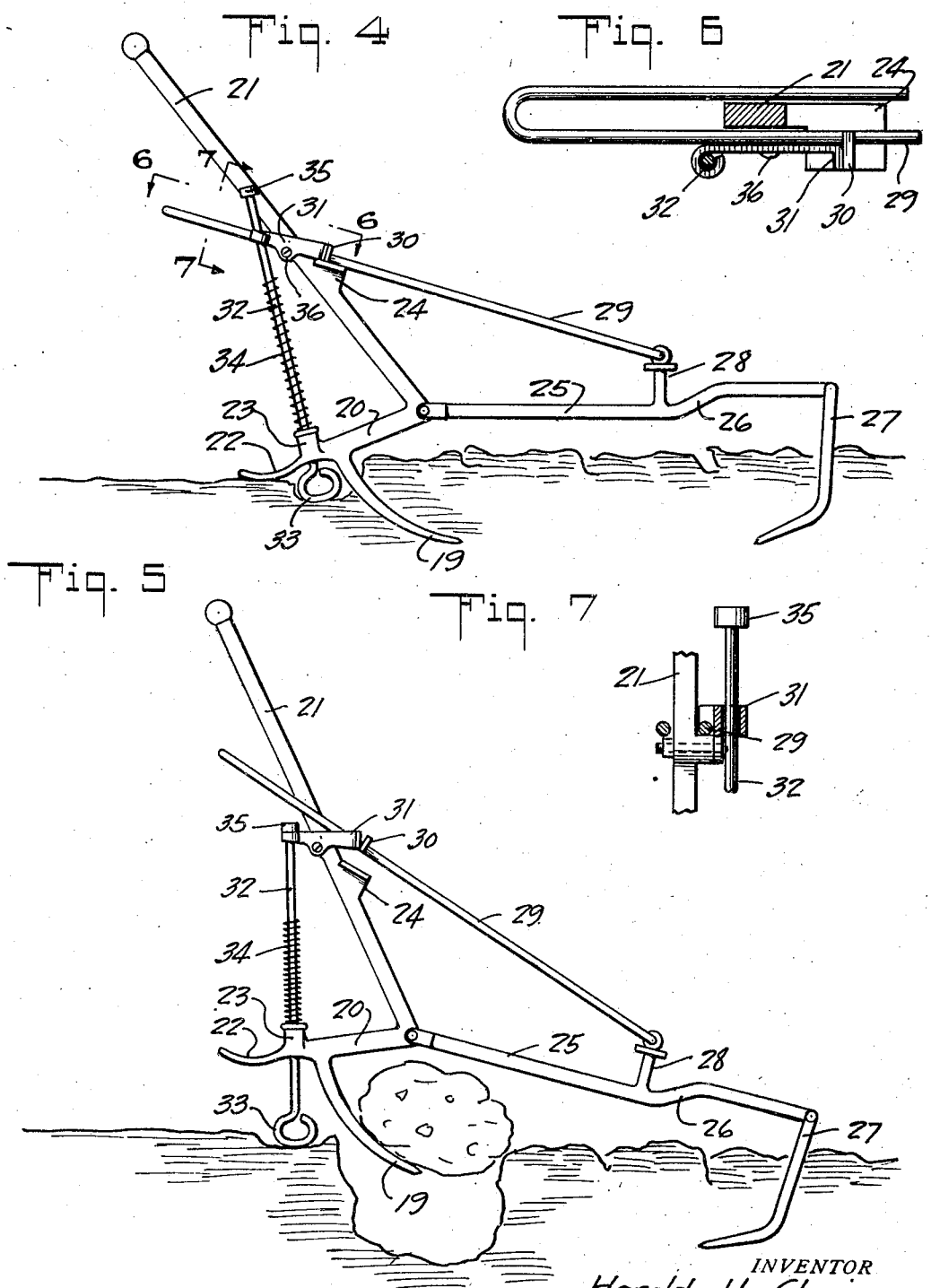

Patented Aug. 11, 1931

1,818,551

UNITED STATES PATENT OFFICE

HAROLD H. GLASIER, OF LOS ANGELES, CALIFORNIA

OSCILLATING SPADER

Application filed August 23, 1929. Serial No. 387,880.

This invention relates to a mechanical spader of simple construction adapted to be advanced along the ground by a bucking motion and simultaneously to break, turn over the ground and pulverize or harrow it. The device is especially adapted for manual operation, but is not limited thereto, and is shown herein in its simplest form, namely, a manually operable spader.

It is a primary object of this invention to provide a mechanical spader of the character described which is operable by oscillation of a single handle. Further objects are to provide a mechanical spader of novel construction, simple in structure, durable, light in weight, compact and adaptable to employment in small gardens.

These objects together with other objects and corresponding accomplishments are obtained by means of the embodiments of my invention illustrated in the accompanying drawings, in which:—

Fig. 1 is a perspective view of a spader with parts in buckled releasing position; Fig. 2 is a side elevation with the parts in expanded position; Fig. 3 is a side elevation showing the parts in buckled spading position; Fig. 4 is a side elevation of another embodiment of my invention including a lock for holding the parts in buckled spading position. Fig. 5 is a side elevation showing the lock released preparatory to expansion. Figs. 6 and 7 are sections as seen on the correspondingly numbered lines of Fig. 4.

Referring particularly to Figs. 1, 2, and 3, the blades of the spade are marked 10 and in this instance the spade is shown of fork form. Extending from the head of the spade is a handle rigidly fixed thereto, having a shank portion 11. The shank portion extends laterally to the blades and has a substantially right angle bend which joins with a stock 12. For convenience of the operator, there is a bend in the stock 13 and secured to the outer end thereof is a cross handle 14. At the juncture of the stock and shank is a cavity in which is received the end 15 of a lever arm 16 forming a knuckle. The lever arm is secured to the handle by a pivot pin 17. Extending laterally from the lever arm 16 are coulters or cultivating shares 18.

The operation of the device may be follower by considering the parts initially as shown in Fig. 1. The shares 18 are forced into the ground by any suitable means so that they serve as an anchor. The handle 13 is then swung to the left and pressure exerted downwardly upon the blades 10 so as to force the latter into the ground. The blades are curved so that as the link formed by the shank 11 and lever arm 16 straightens to the position shown in Fig. 2, the spading blades will hook into the ground. The handle is continued in its swinging movement to the position shown in Fig. 3. In this position, the link has buckled bringing the blades and the shares to near position, very much like the action of jaws. During this closing movement, the shares 18 will be moved or dragged forwardly towards the spading blades. Thus the implement has been moved forward a step. The next action of the operator is to exert a lift upon the handle as indicated in Fig. 3 to break away and raise the soil resting upon the spading blades. The handle then is swung back to the right towards expanding position and finally to the buckled or releasing position shown in Fig. 1. This will cause the bite of soil to be flipped over. The shares 18 will have been advanced a step and the operation now is repeated. The shares follow in the broken soil and harrow and cut the latter.

Referring to Figs. 4 and 5, spading blades are marked 19 and are connected to the shank 20 of a handle, the stock of which is marked 21. A toe 22 projects from the shank and is provided with a boss 23 having a bore. On the stock is a supporting lug 24. Pivotally connected to the handle at the juncture of the shank and stock is a lever arm 25 forming a knuckle. In the present instance, there is an offset 26 in the lever arm so that the shares 27 secured thereto will be raised at their heads to clear the ground.

Extending from the lever arm 25 is a post 28 to which a lock rod 29 is pivotally secured. Lock rod 29 is provided with a shoulder 30 adapted to be disposed on the ledge 24, when the coupling link is buckled as shown in Fig. 4. A catch 31 is pivotally mounted upon the stock of the handle and has an abutment portion adapted to engage the shoulder 30 on the lock rod. A trip rod 32 slidably extends through an opening in the catch 31 and through the bore in boss 23. At the lower end of the trip rod 32 is a foot 33 adapted to be engaged with the ground. Secured to the trip rod 32 and to the boss 23 is a tension spring 34 tending to project the trip rod with its foot towards ground engaging position. It will be noted that there is a stop extension 35 adapted to be engaged with the catch 31 and swing the latter about its pivot 36 with its abutment face raised so as to release the lock rod 29.

In the operation of the device as shown in Figs. 4 and 5, turning the handle to the position shown in Fig. 4 will cause the coupling link to be semilocked in its buckled position. The handle is then swung toward the right, which will cause the soil to be broken away at the blades 19 and raised, swinging about the shares 27 as it turns. The toe 22 is raised from the ground, and the trip is projected by the spring as shown in Fig. 5, causing the latch 31 to be turned, lock rod 29 to be freed and the coupling link to be released from its buckled condition. The operation is then continued and is the same as that previously described for the device shown in Figs. 1, 2 and 3. However, it will be noted that with this construction, only an oscillating motion of the handle is required. It is not necessary to lift the spade blades as in the case of the structure shown in Figs. 1, 2 and 3. The lifting of the structure shown in Figs. 4 and 5 is accomplished due to the swinging of the device about the shares 27.

What I claim is:—

1. A mechanical spader comprising the combination of spading blades, cultivating shares spaced therefrom, a coupling link connecting said shares and blades and provided with an intermediate knuckle, the shares and blades facing one another, a handle connected to one of the arms of said link for buckling the latter and for operating said shares and blades in the manner of jaws.

2. A mechanical spader comprising the combination of: spading blades, an operating handle secured to said blades including a shank extending laterally of said blades and a stock ranging in the direction of said blades; cultivating shares, a lever arm fixed to said shares and extending laterally in relation thereto, said lever arm being pivotally connected to said handle at the juncture of said shank and stock to form a coupling link with a knuckle whereby oscillation of said handle will cause buckling of said link and movement of said shares and blades to and from each other.

3. A mechanical spader comprising the combination of spading blades, an operating handle secured to said blades; cultivating shares, a lever arm fixed to said shares and pivotally connected to said handle to form a coupling link with a knuckle whereby oscillation of said handle will cause buckling of said link; and a lock to hold said link in buckled position with the blades and shares in near position.

4. A mechanical spader comprising the combination of spading blades, an operating handle secured to said blades with the blades extending laterally of the shank of said handle; cultivating shares, a lever arm fixed to said shares and extending laterally in relation thereto, said lever arm and handle being pivotally connected to form a coupling link with a knuckle, the shares and blades facing one another and being movable by said handle in the manner of jaws; and a lock to hold said link in buckled position with the blades and shares in position approaching closing.

5. A mechanical spader comprising the combination of: spading blades, an operating handle secured to said blades including a shank extending laterally of said blades and a stock ranging in the direction of said blades; cultivating shares, a lever arm fixed to said shares and extending laterally in relation thereto, said lever arm being pivotally connected to said handle at the juncture of said shank and stock to form a coupling link with a knuckle whereby oscillation of said handle will cause buckling of said link and movement of said blades and shares to and from each other in the nature of jaws; and a lock for said knuckle to hold said link buckled with the blades and shares in near position.

6. A mechanical spader comprising the combination of spading blades, an operating handle secured to said blades; cultivating shares, a lever arm secured to said shares and pivotally connected to said handle to form a coupling link with a knuckle whereby oscillation of said handle will cause buckling of said link; and a lock rod positioned across extensible from said handle to said lever arm to hold said link in buckled position with the blades and shares in near position.

7. A mechanical spader comprising the combination of spading blades, an operating handle secured to said blades; cultivating shares, a lever arm fixed to said shares and pivotally connected to said handle to form a coupling link with a knuckle whereby oscillation of said handle will cause buckling of said link and a lock rod positioned across extensible from said handle to said lever arm secured to said lever arm and engageable by said handle to hold said link in buckled position.

8. A mechanical spader comprising the combination of spading blades, an operating handle secured to said blades with the blades extending laterally of the shank of said handle; cultivating shares, a lever arm fixed to said shares and extending laterally in relation thereto, said lever arm and handle being pivotally connected to form a coupling link with a knuckle, the shares and blades facing one another and being movable by said handle in the manner of jaws; and a lock rod positioned across extensible from said handle to said lever arm to hold said link in buckled position with the blades and shares in position approaching closing, said lock rod being pivotally secured to said lever arm and detachably engageable by said stock.

9. A mechanical spader comprising the combination of: spading blades, an operating handle secured to said blades including a shank extending laterally of said blades and a stock ranging in the direction of said blades; cultivating shares, a lever arm fixed to said shares and extending laterally in relation thereto, said lever arm being pivotally connected to said handle at the juncture of said shank and stock to form a coupling link with a knuckle whereby oscillation of said handle will cause buckling of said link and movement of said blades and shares to and from each other in the nature of jaws; a lock rod pivotally mounted on said lever arm, and a catch on said stock to engage said rod and retain said link in buckled position with said blades and shares in near position.

10. A mechanical spader comprising the combination of: spading blades, an operating handle secured to said blades including a shank extending laterally of said blades and a stock ranging in the direction of said blades; cultivating shares, a lever arm fixed to said shares and extending laterally in relation thereto, said lever arm being pivotally connected to said handle at the juncture of said shank and stock to form a coupling link with a knuckle whereby oscillation of said handle will cause buckling of said link and movement of said blades and shares to and from each other in the nature of jaws; a lock rod pivotally mounted on said lever arm, a catch on said stock to engage said rod and retain said link in buckled position with said blades and shares in near position, a trip rod for said catch having a foot for engagement with the ground, and resilient means tending to move said trip rod toward ground engagement position and to trip said catch.

11. A mechanical spader comprising the combination of: spading blades, an operating handle secured to said blades including a shank extending laterally of said blades and a stock ranging in the direction of said blades; cultivating shares, a lever arm fixed to said shares and extending laterally in relation thereto, said lever arm being pivotally connected to said handle at the juncture of said shank and stock to form a coupling link with a knuckle whereby oscillation of said handle will cause buckling of said link and movement of said blades and shares to and from each other in the nature of jaws; a toe extending from said shank in position to be engaged with the ground and form a fulcrum, a lock rod pivotally mounted on said lever arm, a catch on said stock to engage said rod and retain said link in buckled position with said blades and shares in near position, a trip rod for said catch slidably extending through said toe with a foot therebelow for engagement with the ground, and a spring tending to project said foot toward the ground and to trip said catch.

In witness that I claim the foregoing I have hereunto subscribed my name this 13th day of August, 1929.

HAROLD H. GLASIER.